United States Patent [19]
Andrew

[11] Patent Number: 5,107,978
[45] Date of Patent: Apr. 28, 1992

[54] ARTICLE DISTRIBUTING APPARATUS

[75] Inventor: Albert I. Andrew, Philadelphia, Pa.

[73] Assignee: CSS International Corporation, Philadelphia, Pa.

[21] Appl. No.: 611,989

[22] Filed: Nov. 13, 1990

[51] Int. Cl.⁵ .............................................. B65G 43/00
[52] U.S. Cl. .................................... 198/437; 198/436; 198/625
[58] Field of Search ............... 198/436, 437, 431, 448, 198/467.1, 419.2, 625, 426

[56] References Cited

U.S. PATENT DOCUMENTS

| | | | |
|---|---|---|---|
| 2,923,395 | 2/1960 | Von Hofe | 198/436 |
| 3,415,351 | 12/1968 | Ware et al. | 198/419.2 X |
| 3,841,946 | 10/1974 | Carter | 198/625 X |
| 4,147,248 | 4/1979 | Kurczak et al. | 198/437 X |
| 4,301,912 | 11/1981 | Cooley et al. | 198/436 |
| 4,779,715 | 10/1988 | Pazdernik | 198/436 |

FOREIGN PATENT DOCUMENTS

| | | | |
|---|---|---|---|
| 0122619 | 7/1985 | Japan | 198/436 |
| 0717375 | 10/1954 | United Kingdom | 198/436 |
| 2177368 | 1/1987 | United Kingdom | 198/625 |

Primary Examiner—Robert P. Olszewski
Assistant Examiner—James R. Bidwell
Attorney, Agent, or Firm—John W. Logan, Jr.

[57] ABSTRACT

Article Distribution apparatus is disclosed having a main frame straddling a conveyor feeding a single row of articles to the inlet of a pair of timing screws. The timing screws are mounted for horizontal and vertical adjustment above the conveyor and are carried by a frame mounted for pivotal movement about a vertical axis at the infeed side of the apparatus. A linear drive mechanism controlled by a programmable controller controls movement of the moveable frame to direct articles in predetermined quantities and spacing to a predetermined number of discharge paths.

13 Claims, 4 Drawing Sheets

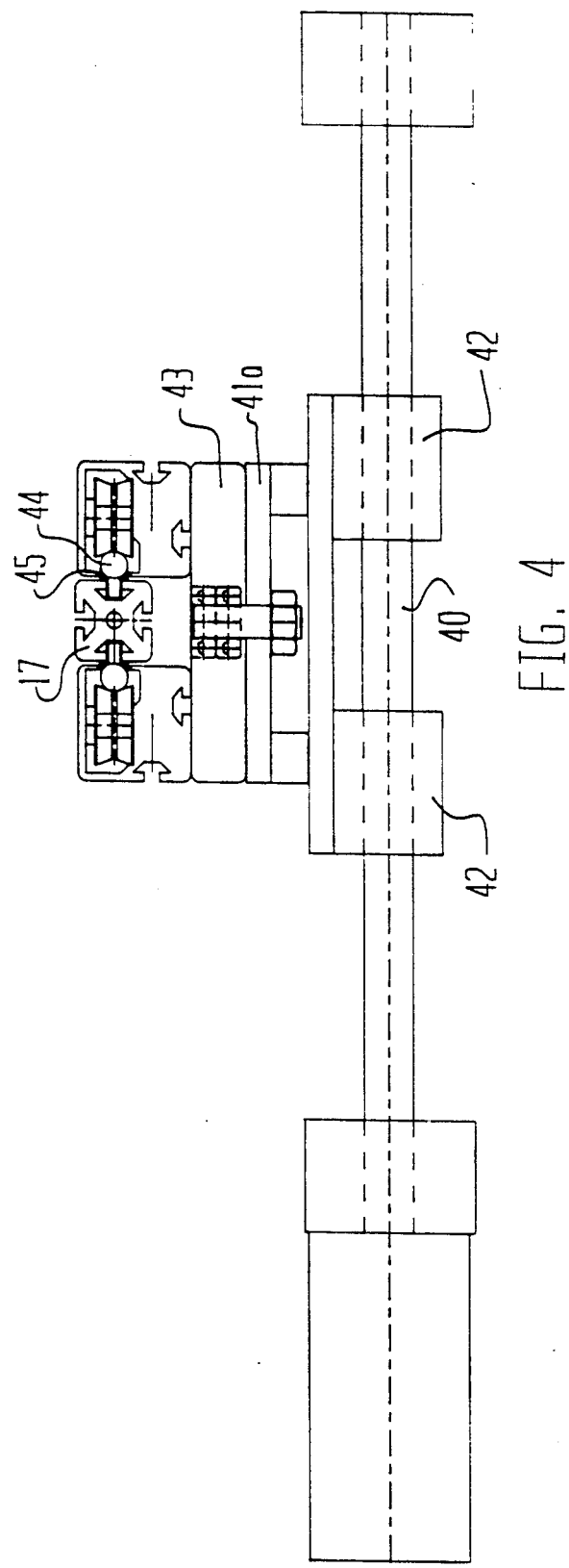

ARTICLE DISTRIBUTING APPARATUS

BACKGROUND OF THE INVENTION

1. Field of the Invention

The present invention relates to apparatus for handling articles and for distributing articles from a single line of production into a plurality of travel paths and, specifically, into a plurality of travel paths wherein the articles can be counted and arranged in spaced-apart groups of preselected numbers.

Normally, articles for production lines, such as containers being filled with a product, come from the filling equipment with sealing means applied to them in a single line in abutting relationship on a conveyor and have to be divided into a plurality of lines and a plurality of groups of products in order to be filled into packages such as three-packs or six-packs or a container containing four lines of six-packs each or twenty four boxes per package. This division of a main stream article line transported on a conveyor into a plurality of travel paths can also be necessary when it is desired to separate containers of similar cross-section shape, by height, or by color, or during an inspection process where it would be necessary to reject containers for articles for flaws or missing components such as caps or labels being absent from the containers. In addition, it is desirable to take containers from a single lane discharge and divide them into groups, for example a three-pack or a six-pack or any other number so that they can be packed into a container for final sale. It is often desirable to bypass containers to different lanes or different conveyors for the purpose of diverting containers onto a conveyor which bypasses a machine whose function is not required for a specific container.

All of the above can be accomplished by having an article distribution apparatus which can be programmable according to preprogrammed information to distribute articles into different paths according to size, color, quantity desired or number of paths desired.

With the above in mind, it is the principal object of the present invention to provide an apparatus for distributing articles into selective travel paths wherein the sequence of distribution is variable and controlled by means of a preprogrammable mechanism.

It is another object of the present invention to provide apparatus for distributing articles into selective travel paths wherein the apparatus is adjustable to accommodate a specific number of objects in specific relationships in each travel path.

It is a further object of the present invention to provide an apparatus for distributing articles into selective travel paths wherein the guide means for distributing the articles can separate the articles from abutting relationship on the infeed to specific spacing between articles on the outfeed to the specific article discharge paths.

2. Description of the Prior Art

The principal prior art known to applicant is U.S. Pat. No. 3,999,648 issued Dec. 28, 1976, to Kennedy. In this patent articles from a single lane are diverted into a plurality of lanes by means of a pivotal article guiding mechanism which can be pre-programmed. In this patent, however, articles are conveyed to the article distributing apparatus in a single line between article guide means with the articles being in a predetermined spaced relationship or in specific abutting relationship. The apparatus of this patent, however, merely provides guide means which can be pivoted from one position to another and transfer the articles to one discharge lane or another with no change in relationship between articles, no means for discharging into specific lanes undesirable or incomplete articles and no means for spacing articles in any particular relationship.

Therefore, the prior art cannot be utilized to arrange articles in specific predetermined relationships.

SUMMARY OF THE INVENTION

In accordance with the present invention, the article distributing apparatus of the present invention is designed to fit over an article feed conveyor on which articles to be distributed are fed in a single line in abutting relationship to the infeed end of the distribution apparatus and are distributed at the discharge end of the distribution apparatus in a preselected pattern in multiple rows. To this end a single set of infeed guide rails between which the articles can be distributor guided is provided at the leading end of the distribution apparatus. Similarly, multiple sets of discharge guide rails are provided at the discharge end of the apparatus to receive and guide the distributed articles. Distribution apparatus including preformed timing screws are provided which will receive articles in abutting relationship, separate the articles as they are being transferred through the distribution apparatus and distribute them according to a pre-programmed arrangement to selected discharge paths.

All of this is accomplished by having a rigid support frame straddling the article conveyor mechanism with a second moveable or pivotable support frame carried by the main support frame and adapted to be moved by a programmable control apparatus including linear drive means. Sensing means are provided to count or determine the condition of articles passing through the distribution apparatus and to direct the articles into preselected paths.

BRIEF DESCRIPTION OF THE DRAWINGS

The foregoing summary as well as the following detailed description, will be better understood when read in conjunction with the figures appended hereto. For the purpose of illustrating the invention, there is shown in the drawings an embodiment which is presently preferred, it being understood, however, that this invention is not limited to the precise arrangement and instrumentalities shown.

FIG. 4 is a sectional view of the support means for the distributional apparatus taken along line 4—4 of FIG. 1.

DETAILED DESCRIPTION OF THE INVENTION

Referring more specifically to the drawings, the article distributing apparatus of the present invention is designed to fit over an article feed conveyor 10 on which articles to be distributed are fed in a single line in abutting relationship to the infeed end of the distributing apparatus and are distributed at the discharge end in a preselected pattern in multiple rows. To this end, a single set of infeed guide rails 11, between which the articles A to be distributed are guided, is provided leading to the infeed end of the apparatus. Similarly, multiple sets of discharge guide rails 12 ar provided at the discharge end of the apparatus to receive and guide the distributed articles along multiple discharge paths. The guide rails 11 and 12 are supported above the conveyor by conventional adjustable support frames 13 and 14, respectively, permitting both vertical and horizontal adjustment of the guide rails to accommodate articles of different dimensions. In the illustrated embodiment of the invention, three article discharge paths are shown. It will be understood, however, that any reasonable number of discharge paths can be selected, depending on the requirements of the user.

Figure 1:
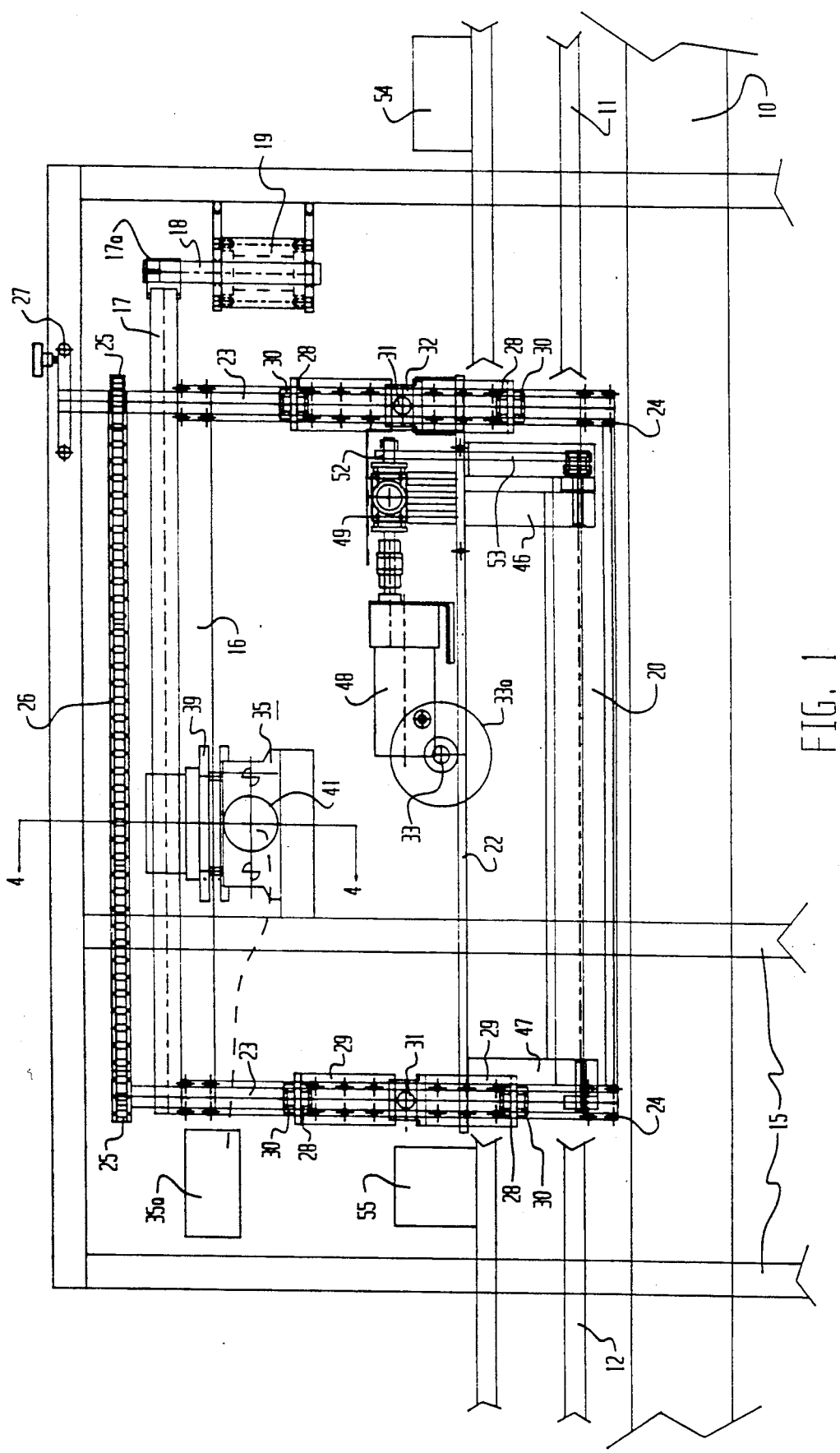
FIG. 1 is a side elevational view of one embodiment of the distribution apparatus of the present invention.
Figure 2:
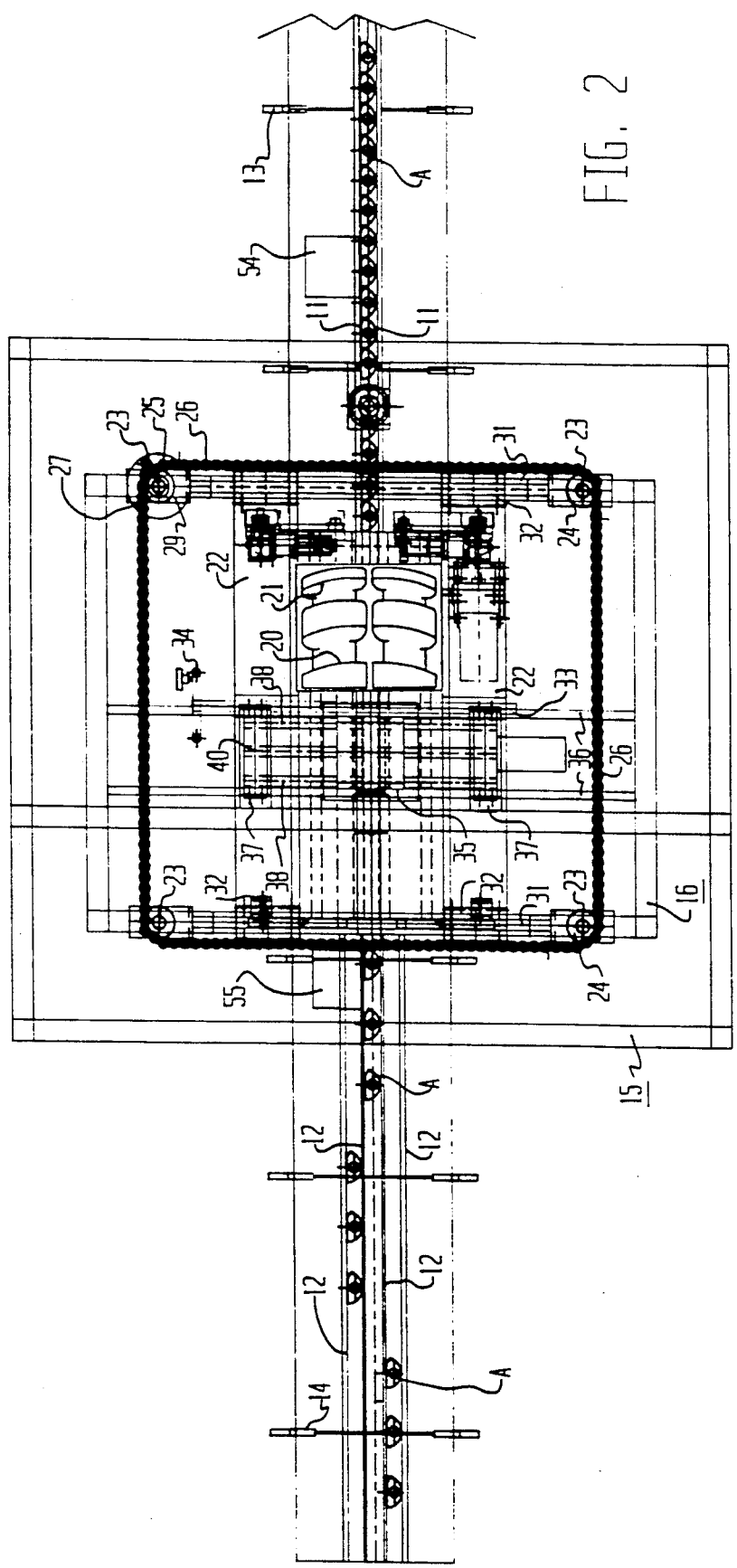
FIG. 2 is a plan view of the distribution apparatus as shown in FIG. 1.

A rigid box shaped support frame 15 is provided adapted to straddle the conveyor 10 and mount the article distributing apparatus above the conveyor. The support frame 15 carries a second movable frame 16 which, in turn, supports the main components of the distributing apparatus. As shown in FIGS. 1 and 2, the movable frame 16 is carried by a support arm 17 extending lengthwise of the apparatus and pivotally supported at the midpoint of the of the infeed end of the distributing apparatus. To pivotally support this arm, a stub shaft 18 is provided pivotally mounted in a support bearing 19 carried by the frame 15. The stub shaft 18 in turn is connected to the support arm 17 as shown at 17A to support the arm 17 in a cantilever fashion. It may be desirable to provide additional support for the free end of the frame 16 to insure rigidity of the frame 16. If that is necessary, a suitable slide and support member, not shown, may be provided extending transversely of the frame 15 adjacent the discharge end of the distributing apparatus. With this above construction, the entire frame 16 can be pivotally moved in a horizontal plane about the axis of the support bearing 19.

In accordance with the present invention, a pair of timing screws 20 rotating in opposite directions is provided to receive the articles one at a time from the infeed rails 11 and control the rate and path of travel of the articles through the distribution apparatus to the desired set of discharge rails. The timing screws each have a helical thread 21 forming a pocket between the screws of generally the same size and shape as the cross-sectional contour of the article being conveyed. The lead angles of the thread 21 may vary along the length of the timing screws to space the discharged articles the desired distance apart. In practice, the timing screws are rotated such that the forward movement of a pocket is slightly less than speed of travel of the conveyor 10 so that the leading edge of a thread controls the speed of travel of the articles throughout the distributing apparatus.

Figure 3:
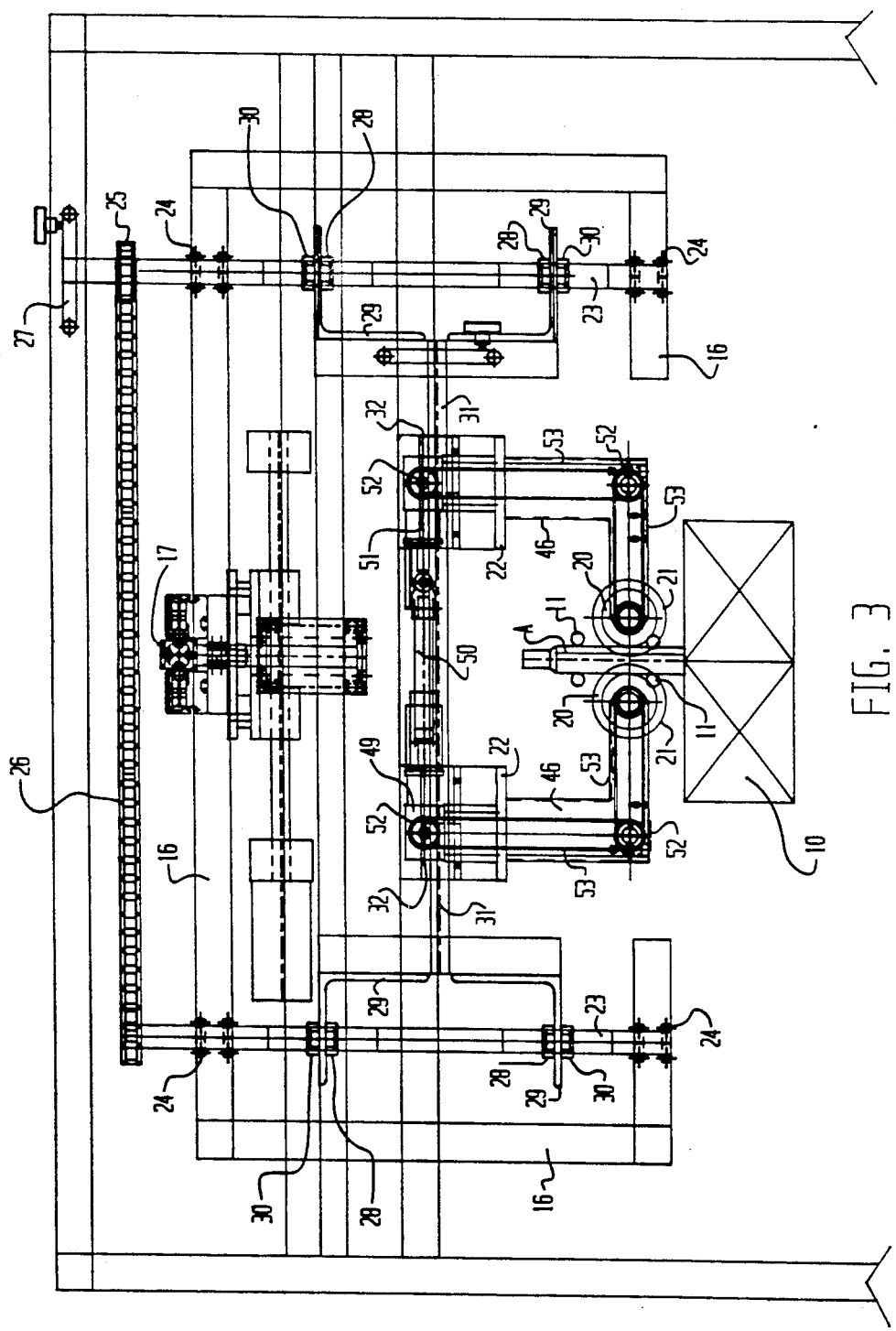
FIG. 3 is a front end elevational view of the distribution apparatus of the present invention.

The timing screws 20 must be adjustably mounted both for height above the conveyor 10 and for horizontal distance between their centers to accommodate different height and different width articles being distributed. To this end, the timing screws and their drive mechanism, more fully described hereafter, are supported by a pair of vertically and horizontally adjustable platforms 22, 22 at opposite sides of the path of travel of the articles A. Each platform 22 is supported by a pair of vertically extending threaded jack screws 23, 23, one at each corner of the frame 16. The jack screws are rotatably mounted within bushings 24 in the frame 16 and are interconnected to be rotated simultaneously in the same direction by a sprocket 25 carried by the upper end of each jack screw and a continuous chain 26 engaging the sprockets 25. A hand wheel 27 secured to the top of one jack screw 23 can be used to simultaneously rotate all of the jack screws. A jack nut 28 is carried by each jack screw 23 and move up or down the jack screws as the jack screws are rotated. Each nut 28 carries a support bracket 29, as shown in FIG. 3, which in turn carry their respective support platforms 22. Thus, rotation of the handwheel 27 will cause simultaneous vertical movement of the platforms 22. Jam nuts 30 are provided on the opposite side of each bracket from the jack nut 28 to lock the platforms in their adjusted vertical position.

The platforms 22, 22 which carry the timing screws 20, 20 may also be adjusted toward and away from each other in a horizontal direction to adjust the spacing between the timing screws. To this end, a pair of slide rods 31, 31 extend in a horizontal direction widthwise of the apparatus with one slide adjacent the infeed end and the other at the discharge end. Opposite ends of the slide rods are connected to and carried by the vertically moveable brackets 29. Bushings 32 carried at opposite ends of each platform 22 engage over the slide rods 31 and support the platforms for horizontal sliding movement.

The two platforms 22, 22 are interconnected at their midpoints by a shaft 33 having oppositely threaded end portions. Appropriately threaded nuts 34, 34 carried by the platforms 22, 22 engage threads on the shaft 33 and, upon rotation of the shaft 33 by a handwheel 33a, the platforms 22, 22 may be adjusted horizontally relative to the path of travel of the articles A.

It is a further important feature of the present invention to be able to pivot the frame 16 according to preprogrammed information to discharge the article passing through the distribution apparatus into preselected separate paths. To accomplish this, a linear drive mechanism 35 is provided mounted on support members 36, 36 formed as part of the main frame 15. One linear drive found to be effective is a motor driven ball screw drive sold by Thomson Industries, Inc. of Port Washington, NY as their 2AC Powerslide TM, specifically Model 2AC-16-ARB-TB powered with a servo stepper motor. This system can be controlled with a Sysmac C20K programmable controller 35a sold by Omron Electronics, Inc. of Schaumburg, IL. This programmable controller feeds signals to the motor controller to control operation of the motor 35. Other suitable programmable controllers may also be used. The linear drive 35 includes a pair of mounting blocks 37 at opposite ends of the drive secured to the frame members 36. Guide rods 38 extend between the mounting block and a slide table 39 is mounted for sliding movement on the guide rods. A threaded shaft 40 driven by a controllable motor 41 extends parallel to the guide rods and is engaged by ball screw followers 42 carried by the table to cause movement of the table in a horizontal plane transversely of the distributing apparatus. The table 39 is interconnected to the arm 17 by means of a connecting plate 43 pivotally mounted on the table 39 and carrying ball followers 44 engaged within slots 45 on the sides of the arm. With this construction, actuation of the motor 41 will cause the arm 17 and the entire distributing apparatus including the timing screws 20 to pivot in a horizontal plane about the axis of the stub shaft 18. The programmable controller can cause the timing screws at the discharge end of the apparatus to align with selected discharge paths in accordance with the direction of the user.

As previously set forth, the timing screws 20 are rotated in opposite directions to receive articles A one at a time in the pockets between adjacent timing screw threads and control movement of the articles. At the infeed end of the distributing apparatus L-shaped support arms 46, 46 carried by the platforms 22, 22 support the leading ends of the timing screws. Similar support brackets 47, 47 depending from the platforms 22, 22 at the discharge end of the distributing apparatus support the discharge ends of the timing screws. The timing screws are driven by a motor 48 mounted on one platform 22. The motor is connected to a three-way crown gear drive 49 carried on the same platform which, by means of a splined shaft 50 drives a two-way crown gear drive 51 on the other platform 22. Pulleys 52 and drive belts 53 provide for the transmission of power from the crown gear drives 49 and 51 to their respective timing screws.

In operation, articles have to be fed between the infeed rails in abutting relationship so that an article is available to be received by the feed screw as the feed screw pocket opens. Failure to have articles available at the proper time could, depending on the shape of the article, result a jam between the feed screws. Thus, there is the need for a suitable proximity sensor 54 to detect gaps between articles and shut down the apparatus if an article is not present at the infeed end of the apparatus. Similarly, the programmable controller, described previously, will require a suitable counter 55 at the discharge end to give it a count of articles exiting the apparatus. Further, the inlet ends of the timing screws are spaced inwardly of the pivot point for the distributing apparatus and will thus move along a short arc when the frame 16 is pivoted. This can cause a feed problem with some article shapes. Therefore, it might be desirable, in some instances, to provide flexible infeed guide rails and have their terminal ends anchored to the timing screw support brackets.

While a particular embodiment of the present invention has been illustrated and described herein, it is not intended to limit the invention to such a disclosure and changes and modifications may be incorporated therein within the scope of the following claims.

What is claimed is:

1. Apparatus for receiving articles on a moving conveyor at an infeed end in a single row and distributing the articles in a preselected pattern and multiple rows at a discharge end comprising:
   support means extending over the conveyor;
   platform means pivotally carried by said support means for pivotal movement about a vertical axis adjacent the infeed end of said apparatus;
   a pair of parallel timing screws carried by said platform means having an infeed end in general alignment with the single row of articles at the infeed end of said apparatus and a discharge end at the discharge end of said apparatus, said timing screws each having a helical thread portion forming between the timing screws a pocket to receive a single article from said row and control movement thereof;
   first drive means to rotate said timing screws; and
   second drive means to cause pivotal movement of said platform means and align the discharge end of said timing screw selectively with any one of said multiple discharge rows.

2. Apparatus in accordance with claim 1 wherein said platform means includes a pair of parallel platforms extending lengthwise of said apparatus in the direction of movement of said conveyor, each of said platforms mounting a single one of said pair of timing screws;
   first adjusting means to simultaneously adjust the position of said platforms toward and away from one another; and
   second adjusting means to simultaneously adjust the position of said platforms vertically with respect to said conveyor.

3. Apparatus in accordance with claim 2 wherein said first drive means includes an electric motor mounted on one of said platforms, and a drive connection from said electric motor to each one of said pair of timing screws.

4. Apparatus in accordance with claim 2 wherein said platforms are carried by a movable frame, said frame being pivotally mounted on said support means for pivotal movement about said vertical axis.

5. Apparatus in accordance with claim 4 wherein said first adjusting means comprises a pair of slide rods carried by said movable frames, means mounting said platforms for sliding movement on said slide rods, and means extending between said platforms to move said platforms toward and away from each other.

6. Apparatus in accordance with claim 5 wherein the means to move said platforms comprises a threaded screw member having oppositely threaded end portions connected to said platforms, and a handwheel to rotate said screw member.

7. Apparatus in accordance with claim 4 wherein said second adjusting means comprises vertically extending jack screws carried by said movable frame, threaded nut portions on said jack screws supporting said platforms, and means to rotate said jack screws to raise and lower said platforms.

8. Apparatus in accordance with claim 7 wherein the means to rotate said jack screws comprises sprockets secured to said jack screws, a chain drive engaging said sprockets, and a handwheel attached to one jack screw to rotate the same.

9. Apparatus in accordance with claim 4 wherein said second drive means comprises a linear drive mechanism carried by said support means, a connecting member driven by said linear drive mechanism in a horizontal direction transversely of said conveyor and means interconnecting said connecting member with said movable frame.

10. Apparatus in accordance with claim 9 wherein said linear drive mechanism comprises a pair of mounting blocks attached to said support means, a pair of parallel slide rods extending between said mounting blocks in a direction transverse to said conveyor, a slide table mounted on said slide rods for sliding movement therealong, the connecting member being carried by said slide table, and an electric motor supported from one of said mounting blocks to move said slide table along said slide rods.

11. Apparatus in accordance with claim 10 wherein said electric motor is a controllable stepper motor, and a programmable controller connected to said electric motor to control operation thereof.

12. Apparatus in accordance with claim 11 including first sensing means to determine the presence of articles at the infeed end of said apparatus.

13. Apparatus in accordance with claim 11 including second sensing means at the discharge end of said apparatus to produce a signal each time it senses an article and provide said signal to said programmable controller.

* * * * *